United States Patent
Miyabe et al.

(10) Patent No.: US 7,502,540 B2
(45) Date of Patent: Mar. 10, 2009

(54) OPTICAL FIBER AND OPTICAL TRANSMISSION MEDIUM

(75) Inventors: Ryo Miyabe, Tokyo (JP); Yu Mimura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/815,243

(22) PCT Filed: Sep. 13, 2006

(86) PCT No.: PCT/JP2006/318193

§ 371 (c)(1),
(2), (4) Date: Aug. 1, 2007

(87) PCT Pub. No.: WO2007/037127

PCT Pub. Date: Apr. 5, 2007

(65) Prior Publication Data

US 2008/0159704 A1 Jul. 3, 2008

Related U.S. Application Data

(60) Provisional application No. 60/721,593, filed on Sep. 29, 2005.

(30) Foreign Application Priority Data

Mar. 20, 2006 (JP) ............................. 2006-077558

(51) Int. Cl.
*G02B 6/02* (2006.01)
*G02B 6/36* (2006.01)

(52) U.S. Cl. ...................... 385/127; 385/126

(58) Field of Classification Search .......... 385/123–128
See application file for complete search history.

(56) References Cited

U.S. PATENT DOCUMENTS 6,334,019 B1 * 12/2001 Birks et al. ................. 385/125

(Continued)

FOREIGN PATENT DOCUMENTS

JP 10 95628 4/1998

(Continued)

OTHER PUBLICATIONS

Yao, B. et al.,"A Study of Utilization of Holey Fibers", Technical Report of IEICE, vol. 102, No. 581, pp. 47-50, 2003. (With partial English translation).

(Continued)

*Primary Examiner*—Sung H Pak
*Assistant Examiner*—Daniel Petkovsek
(74) *Attorney, Agent, or Firm*—Oblon, Spivak, McClelland, Maier & Neustadt, P.C.

(57) ABSTRACT

An optical fiber includes a core region and a cladding region. The cladding region includes a first cladding region on an outer circumference of the core region, the first cladding region including a main-medium region and a sub-medium region having a refractive index lower than a refractive index of the main-medium region. The sub-medium region includes inner sub-medium regions arranged at four folds rotationally symmetric centering on the core region, and outer sub-medium regions arranged at four folds rotationally symmetric centering on the core region on an outer side of the inner sub-medium regions.

15 Claims, 8 Drawing Sheets

U.S. PATENT DOCUMENTS

| | | |
|---|---|---|
| 7,085,464 B2 | 8/2006 | Miyabe et al. |
| 7,164,830 B2 | 1/2007 | Hiroishi et al. |
| 2003/0180018 A1* | 9/2003 | Hasegawa .................. 385/125 |
| 2006/0213230 A1 | 9/2006 | Miyabe et al. |
| 2008/0124036 A1* | 5/2008 | Miyabe et al. .............. 385/125 |
| 2008/0159704 A1 | 7/2008 | Miyabe et al. |

FOREIGN PATENT DOCUMENTS

| | | |
|---|---|---|
| JP | 2002 145634 | 5/2002 |
| JP | 2002 277665 | 9/2002 |
| JP | 2003 277090 | 10/2003 |
| JP | 2004 220026 | 8/2004 |
| JP | 2005 62477 | 3/2005 |

OTHER PUBLICATIONS

Hasegawa, T. et al., "Novel Hole-assisted Lightguide Fiber Exibiting Large Anomalous Dispersion and Low Below 1 dB/KM", Optical Fiber Communication Conference, vol. 54, pp. PD5-1-PD5-3, 2003.
Hasegawa, T. et al., "Recent Advanced in Applications of Holey Fibers", 9th Microoptics Conference (MOC'03), 2003.
Nishioka, D. et al., "Development of A Holey Fiber with Ultra-low Bending Loss", Technical Report of IEICE, pp. 23-26, 2003.
U.S. Appl. No. 11/791,855, filed May 30, 2007, Miyabe, et al.
U.S. Appl. No. 11/815,243, filed Aug. 1, 2007, Miyabe, et al.
U.S. Appl. No. 11/909,045, filed Sep. 18, 2007, Miyabe, et al.
U.S. Appl. No. 11/908,975, filed Sep. 18, 2007, Miyabe, et al.
U.S. Appl. No. 12/169,182, filed Jul. 8, 2008, Miyabe, et al.

* cited by examiner

FIG.3

| MEASUREMENT WAVELENGTH | CUT-OFF WAVELENGTH | MACRO-BENDING LOSS AT r=7.5 mm | MACRO-BENDING LOSS AT r=5 mm | WAVELENGTH DISPERSION | DISPERSION SLOPE | MFD | PMD |
|---|---|---|---|---|---|---|---|
| | | 1550 nm | 1550 nm | 1550 nm | 1550 nm | 1550 nm | 1550 nm |
| | nm | dB/m | dB/m | ps/nm/km | ps/nm/km$^2$ | µm | ps/rkm |
| SAMPLE #1 | 1280 | < 0.01 | 0.09 | 33.5 | 0.0726 | 6.9 | 0.06 |

FIG. 4

| MEASUREMENT WAVELENGTH | Δn1 | d | LOWEST HIGHER-ORDER MODE TRANSMISSION LOSS | | MACRO-BENDING LOSS AT r=7.5 mm | MACRO-BENDING LOSS AT r=5 mm | MFD |
|---|---|---|---|---|---|---|---|
| | | | 1500 nm | 1250 nm | 1550 nm | 1550 nm | 1550 nm |
| | % | μm | dB/m | dB/m | dB/m | dB/m | μm |
| SAMPLE #2 | 0.37 | 6.0 | 540.8 | 24.1 | 0.05 | 0.415 | 7.417 |
| SAMPLE #3 | 0.37 | 6.8 | 62.3 | 14.26 | 0.0049 | 0.0317 | 6.907 |
| SAMPLE #4 | 0.33 | 6.4 | 174.51 | 79.5 | 0.053 | 0.347 | 7.2529 |
| SAMPLE #5 | 0.33 | 6.0 | 519.70 | 116.9 | 0.098 | 1.15 | 7.517 |
| SAMPLE #6 | 0.33 | 6.8 | 59.50 | 53.78 | 0.0142 | 0.083 | 6.971 |
| SAMPLE #7 | 0.4 | 6.4 | 304.60 | 3.964 | 0.0073 | 0.06 | 7.112 |
| SAMPLE #8 | 0.4 | 6.0 | 525.70 | 6.64 | 0.02 | 0.19 | 7.341 |
| SAMPLE #9 | 0.4 | 6.8 | 72.33 | 2.1 | 0.0021 | 0.015 | 6.864 |

FIG.5

| | d | L1 | L2 | LOWEST HIGHER-ORDER MODE TRANSMISSION LOSS | MACRO-BENDING LOSS AT r=7.5 mm | MACRO-BENDING LOSS AT r=5 mm | MFD |
|---|---|---|---|---|---|---|---|
| MEASUREMENT WAVELENGTH | | | | 1250 nm | 1550 nm | 1550 nm | 1550 nm |
| | μm | μm | μm | dB/m | dB/m | dB/m | μm |
| SAMPLE #10 | 12.0 | 12.5 | 26.2 | 12 | 0.00124 | 0.31 | 8.55 |
| SAMPLE #11 | 10.0 | 11.5 | 23.0 | 12 | 0.0029 | 0.1 | 8.58 |
| SAMPLE #12 | 8.0 | 10.5 | 21.0 | 80 | 0.03 | 0.8 | 8.62 |
| SAMPLE #13 | 9.0 | 11.0 | 22.0 | 34 | 0.0098 | 0.29 | 8.6 |
| SAMPLE #14 | 7.0 | 10.0 | 19.0 | 26 | 0.029 | 0.6 | 8.65 |
| SAMPLE #15 | 7.0 | 10.0 | 20.0 | 194 | 0.085 | 2 | 8.65 |
| SAMPLE #16 | 9.0 | 11.0 | 23.0 | 374 | 0.033 | 1.4 | 8.6 |
| SAMPLE #17 | 10.0 | 11.5 | 24.0 | 297 | 0.011 | 0.64 | 8.58 |
| SAMPLE #18 | 12.0 | 12.5 | 26.0 | 23 | 0.00094 | 0.15 | 8.56 |
| SAMPLE #19 | 10.0 | 11.5 | 23.4 | 48 | 0.0051 | 0.21 | 8.58 |

OPTICAL FIBER AND OPTICAL TRANSMISSION MEDIUM

TECHNICAL FIELD

The present invention relates to a microstructured optical fiber, in which a plurality of sub-medium regions consisting of a sub medium having a refractive index lower than that of a main medium in a cladding thereof, and an optical transmission medium.

BACKGROUND ART

In general, an optical fiber is composed of a core region and a cladding region. The core region is made of a silica glass of which a refractive index is increased by doping, for example, a germanium. The cladding region is made of a silica glass having a refractive index lower than that of the core region, which forms a layer surrounding a circumference of the core. A light propagates through the core region by a total reflection of the light at a boundary between the core region and the cladding region. Conventionally, a relative refractive index difference between the core region and the cladding region is at largest 3% to 4%.

On the other hand, in recent years, an optical fiber has been reported with which a large relative refractive index difference can be obtained compared to the above structured optical fiber (see, for example, Patent Literature 1). According to the Patent Literature 1, it has been reported that an average refractive index of the cladding region can be greatly reduced by placing a microstructure, which is formed by arranging a plurality of holes in the glass of the cladding region, in a longitudinal direction. In other words, the optical fiber having the above microstructure can dramatically increase an effective refractive index of the core region compared to the conventional optical fiber.

Given this situation, in recent years, a microstructured optical fiber has been a focus of constant attention, in which a hole or the like is formed in a surrounding area of the core region of an optical fiber having a refractive index profile structure equivalent to a typical single mode optical fiber (SMF). For instance, it has been reported that a macro-bending loss against a small-diameter bending with a diameter of 15 mm (macro-bending loss r=15 mm) could be lowered to 0.04 dB/m by placing the microstructure (see, for example, Nonpatent Literature 1). After that, there has been another report that the macro-bending loss could be further lowered up to below 0.01 dB/m (see, for example, Nonpatent Literature 2). On the other hand, an optical fiber has been proposed, in which the macro-bending loss is lowered while maintaining a large mode field diameter (MFD) in view of connection with the conventional SMF (see, for example, Patent Literature 2).

The optical fiber described in the Patent Literature 2 includes a microstructure in which a hexagonal lattice array of sub-medium region is formed in multilayer in the cladding region placed on a circumference of the core region. In other words, the optical fiber has a microstructure in which the sub-medium region is formed in multilayer at six folds rotationally symmetric centering on the core region. The sub-medium region is composed of an air, a liquid, or a glass filling each of the holes formed in the hexagonal lattice array in multilayer in the cladding region, having a refractive index lower than that of a main medium of the cladding region.

The microstructure in which the sub-medium region is formed in multilayer at the six folds rotational symmetry (hereinafter, "microstructure of the six folds rotational symmetry") is effective as a structure for an optical fiber that lowers the macro-bending loss, propagating a signal light of a predetermined wavelength band in a single mode.

Patent Literature 1: Japanese Patent No. 3306847
Nonpatent Literature 1: T. Hasegawa, et al., Microoptics Conference (2003), K2
Nonpatent Literature 2: Daizo Nishioka, et al., Technical Report of IEICE, OFT 2003-63, P. 23
Patent Literature 2: Japanese Patent Application Laid-Open No. 2004 220026

DISCLOSURE OF INVENTION

Problem to be Solved by the Invention

However, in the conventional microstructured optical fiber described above, because a refractive index profile is different in each direction of two axes perpendicular to each other on a center axis in a longitudinal direction (i.e., the center axis of the core region), an anisotropy occurs in the refractive index profile of the two axes, which results in a case in which a polarization mode dispersion (PMD) is increased.

Furthermore, in the optical fiber having the microstructure of the six folds rotational symmetry described above, it is necessary to form the sub-medium regions of a small diameter, i.e., holes, in the cladding region in a very dense state to propagate a light in a single mode while lowering the macro-bending loss. Therefore, it is difficult to manufacture the optical fiber having a small diameter and highly dense microstructure.

The present invention is made in consideration of the above problems, and it is an object of the present invention to easily realize the optical fiber that can propagate a light in a single mode while lowering the macro-bending loss and the PMD at the same time. Another object of the present invention is to offer an optical transmission medium that can reduce the macro-bending loss even when a bending with a small curvature radius is build up in an optical transmission line.

Means for Solving Problem

To solve the above problems and to achieve the object, an optical fiber according to the present invention includes a core region and a cladding region. The cladding region includes a first cladding region on outer circumference of the core region, the first cladding region consisting of a main-medium region and a sub-medium region having a refractive index lower than a refractive index of the main-medium region. The sub-medium region includes inner sub-medium regions arranged at four folds rotationally symmetric centering on the core region, and outer sub-medium regions arranged at four folds rotationally symmetric centering on the core region on outer side of the inner sub-medium regions.

Furthermore, in the optical fiber according to the present invention, lateral cross sections of the inner sub-medium regions and lateral cross sections of the outer sub-medium regions are circular shaped having a substantially same diameter.

Moreover, in the optical fiber according to the present invention, a hole is formed at each of the four folds rotational symmetry along a center axis of the core region, and the inner sub-medium regions and the outer sub-medium regions are formed with any one of a gaseous substance, a liquid, and a solid substance that fills inside of the hole.

Furthermore, in the optical fiber according to the present invention the cladding region includes a second cladding region that is homogeneous on outer circumference of the first cladding region, and a relative refractive index difference of the core region with respect to the second cladding region is equal to or larger than 0.3% and equal to or smaller than 0.4%.

Moreover, in the optical fiber according to the present invention, a medium of the second cladding region is a pure silica glass.

Furthermore, in the optical fiber according to the present invention, a medium of the second cladding region is a fluorine-doped silica glass.

Moreover, in the optical fiber according to the present invention, a medium of the second cladding region is same a medium that forms the main-medium region of the first cladding region.

Furthermore, in the optical fiber according to the present invention, the core region is formed by a silica glass doped with at least one of germanium and phosphor.

Moreover, in the optical fiber according to the present invention, a light in a wavelength band of equal to or longer than 1550 nm propagates through the optical fiber in a single mode.

Furthermore, in the optical fiber according to the present invention, a light in a wavelength band of equal to or longer than 1250 nm propagates through the optical fiber in a single mode.

Moreover, in the optical fiber according to the present invention, a mode field diameter at a wavelength of 1550 nm is equal to or larger than 6 μm and equal to or smaller than 11 μm, and a macro-bending loss with a curvature radius of 7.5 mm at the wavelength of 1550 nm is equal to or less than 0.1 dB/m.

Furthermore, in the optical fiber according to the present invention, a macro-bending loss with a curvature radius of 5.0 mm at a wavelength of 1550 nm is equal to or less than 0.1 dB/m.

Moreover, an optical transmission medium according to the present invention includes any one of the optical fibers described above, in a condition in which the optical fiber is bent with a curvature radius of equal to or larger than 3 mm and equal to or smaller than 60 mm.

Furthermore, in the optical fiber according to the present invention, the optical fiber is in a condition in which the optical fiber is rolled in a coil with the curvature radius of equal to or larger than 3 mm and equal to or smaller than 60 mm.

Moreover, in the optical transmission medium according to the present invention, the optical fiber is connected to other optical fiber in a condition in which an end of the sub-medium region formed in the cladding region along the center axis of the core region is closed.

Furthermore, in the optical transmission medium according to the present invention, the end of the sub-medium region is sealed by filling a predetermined filling agent in the end of the sub-medium region.

Moreover, in the optical transmission medium according to the present invention, the end of the sub-medium region is closed by collapsing the end of the sub-medium region.

EFFECT OF THE INVENTION

According to the present invention, it is possible to lower a confinement of a higher-order mode light in the core region while maintaining the confinement effect of the fundamental mode light in the core region, and to even out the refractive index profile in each axis direction of the two axes perpendicular to each other on a center of a lateral cross section of the core region. As a result, there is an effect that the optical fiber, which can propagate a light in a single mode while lowering the macro-bending loss and the PMD at the same time, can be easily realized. Furthermore, by using the optical fiber according to the present invention, there is an effect that an optical transmission medium, which can reduce the macro-bending loss and the PMD even when a bending with a small curvature radius is build up in an optical transmission line, and can transmit a light in a single mode, can be easily realized.

BRIEF DESCRIPTION OF DRAWINGS

FIG. 3 is a table of characteristics of a sample as a first embodiment example of the optical fiber according to the present invention;

FIG. 4 is a table of characteristics of samples as a second embodiment example of the optical fiber according to the present invention;

FIG. 5 is a table of characteristics of samples as a third embodiment example of the optical fiber according to the present invention;

EXPLANATIONS OF LETTERS OR NUMERALS

Figure 1:
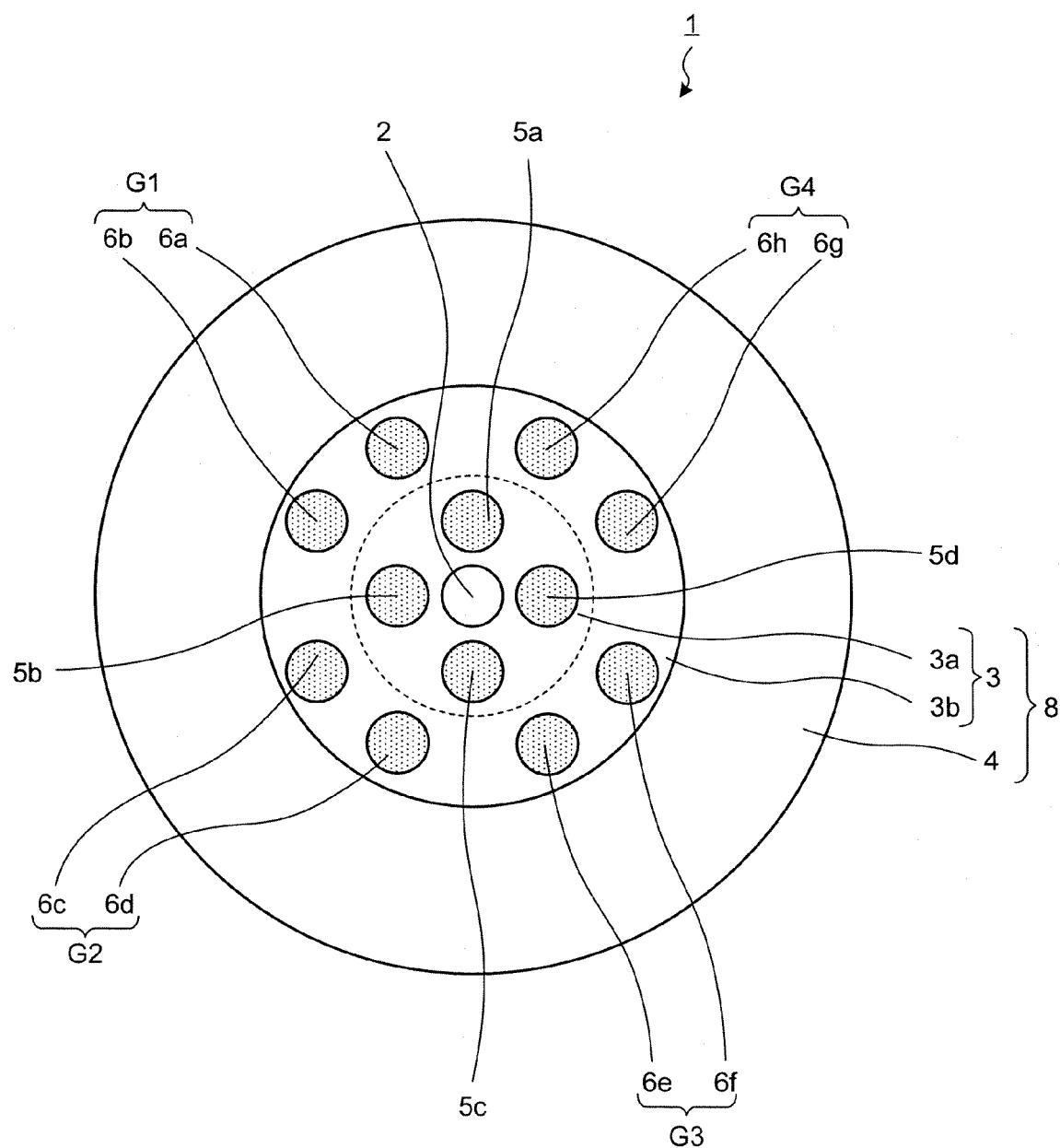
FIG. 1 is a lateral cross section of an example of an optical fiber according to an embodiment of the present invention.

1 Optical fiber
2 Core region
3 First cladding region
3a Inner cladding area
3b Outer cladding area
4 Second cladding region
5a to 5d, 6a to 6h Sub-medium regions
7a hole
8 Cladding region
9 Sealed region
11 Refractive-index matching agent
20, 30 Optical transmission medium
21 Bobbin
101, 102 Backbone system optical fiber
103 Core region
110 obstacle
B1, B2 Bending portion
C1, C2 Connecting portion
G1 to G4 Sub-medium group

BEST MODE(S) FOR CARRYING OUT THE INVENTION

Exemplary embodiments of an optical fiber and an optical transmission medium according to the present invention will be explained in detail below with reference to the accompanying drawings. The embodiments according to the present invention are mere examples of embodying the present invention, and do not limit the technical scope of the present invention.

EMBODIMENT

An optical fiber according to an embodiment of the present invention will be explained first. FIG. 1 is a lateral cross section of an example of the optical fiber according to the embodiment of the present invention. An optical fiber 1 according to the embodiment is a microstructured optical fiber having a plurality of sub-medium regions arranged in a cladding region 8. As shown in FIG. 1, the optical fiber 1 includes a core region 2 through which a light propagates, a first cladding region 3 in which a plurality of sub-medium regions 5a to 5d and a plurality of sub-medium regions 6a to 6h are arranged, and a second cladding region 4 formed with a substantially homogeneous medium. In such a manner, the cladding region 8 includes the first cladding region 3 and the second cladding region 4. The core region 2, the first cladding region 3, and the second cladding region 4 are sequentially arranged in a concentric manner from a center axis of the optical fiber 1 in a longitudinal direction (i.e., a center of a lateral cross section of the optical fiber 1) toward outside.

The core region 2 is formed with, for example, a silica glass doped with a dopant to increase the refractive index, and is arranged substantially at the center of the lateral cross section of the optical fiber 1 (i.e., on the center axis of the optical fiber 1 in the longitudinal direction). The core region 2 serves as a propagation channel for a light. In addition, by forming the core region 2 that is doped with a dopant to increase the refractive index, it is possible to reduce a transmission loss of the light propagating through the core region 2. The dopant to be doped in the medium of the core region 2 includes, for example, at least one of germanium (Ge) and phosphorus (P).

In a standard SMF used for the propagation channel for a light, the relative refractive index difference Δn1 between the core region and the cladding region is typically equal to or larger than 0.3% and equal to or less than 0.4%. At this moment, when the core region of the SMF is doped with germanium, the mol concentration of germanium is about 3 mol % to 4 mol %. In the core region 2 of the optical fiber 1 to be connected to such a standard SMF, it is preferable to dope germanium of the same mol concentration as that for the core region of the SMF. This will allow the relative refractive index difference Δn1 of the core region 2 to the second cladding region 4 (for example, a pure silica glass) to be set to equal to or larger than 0.3% and equal to or less than 0.4%, as in the case of the SMF. As a result, it becomes possible to reduce a connection loss between the SMF and the optical fiber 1.

The relative refractive index difference Δn1(%) is defined by Equation (1) using the maximum refractive index of the core region 2 $n_{core}$ and the refractive index of the second cladding region 4 $n_{clad}$.

$$\Delta n1 = \{(n_{core} - n_{clad})/n_{core}\} \times 100 \quad (1)$$

The first cladding region 3 has a microstructure in which a plurality of sub-medium regions is arranged.

The first cladding region 3 is arranged at an outer circumference of the core region 2, consisting of a main medium having a refractive index lower than the refractive index of the core region 2 and a plurality of sub-medium regions having a refractive index lower than the refractive index of the main-medium region. Upon dividing the first cladding region 3 into an inner cladding area 3a and an outer cladding area 3b in a concentric manner centering on the core region 2 (see FIG. 1), the first cladding region 3 includes the sub-medium regions 5a to 5d in the inner cladding area 3a, and the sub-medium regions G1 to G4 in the outer cladding area 3b. In this manner, the first cladding region 3 has a microstructure in which the sub-medium regions 5a to 5d and the sub-medium groups G1 to G4 are arranged in multilayer in a radial direction. Furthermore, the inner cladding area 3a and the outer cladding area 3b can also be arranged to be overlapped each other. The main medium of the first cladding region 3 is, for example, a pure silica glass or a fluorine-doped silica glass. The pure silica glass described above means a silica glass that is not doped with a substance that is doped for a purpose of changing the refractive index (for example, Ge, F, etc.), and may contain $Cl_2$ or the like.

The sub-medium regions 5a to 5d are arranged at each of four folds rotationally symmetric centering on the core region 2 in the inner cladding area 3a. The sub-medium groups G1 to G4 are arranged at each of four folds rotationally symmetric centering on the core region 2 in the outer cladding area 3b. The sub-medium groups G1 to G4 are formed with, for example, a pair of two sub-medium regions, i.e., the sub-medium regions 6a and 6b, the sub-medium regions 6c and 6d, the sub-medium regions 6e and 6f, and the sub-medium regions 6g and 6h, respectively. The sub-medium regions 5a to 5d and the sub-medium regions 6a to 6h are made of a medium having a refractive index lower than the refractive index of the main medium of the first cladding region 3, such as a liquid, a gaseous substance (e.g., air), or a solid substance that fills inside of the holes formed in the first cladding region 3.

Specifically, the holes for arranging the sub-medium regions 5a to 5d have a lateral cross section that is substantially circular shaped, being arranged at the four folds rotationally symmetric along the core region 2 in the inner cladding area 3a. The sub-medium regions 5a to 5d are formed with a medium filling the inside of each of the holes formed in the inner cladding area 3a. Similarly, the holes for arranging the sub-medium regions 6a to 6h are formed at the four folds rotationally symmetric along the core region 2 in the outer cladding area 3b. The sub-medium regions 6a to 6h are formed with a medium filling the inside of each of the holes formed in the outer cladding area 3b.

The inner cladding area 3a and the outer cladding area 3b having the above structure can greatly reduce an average refractive index, compared to a case in which the main medium is used only. As a result, it is possible to set a relative refractive index difference between the core region 2 and the first cladding region 3 to a considerably larger value with ease. In this case, in consideration of an optical transmission in a single mode with a reduction of the macro-bending loss, the sub-medium regions 5a to 5d on the inner side and the sub-medium regions 6a to 6h on the outer side are arranged by optimizing diameters of the lateral cross sections (i.e., diameters of the holes) and a distance between a location of the center of the lateral cross section (i.e., a location of a center axis of the hole) and the center of the lateral cross section of the core region 2 (hereinafter, "center-to-center distance"). In this manner, a proportion of the whole lateral cross sections of the sub-medium regions 5a to 5d to the lateral cross section of the inner cladding area 3a and a proportion of the whole lateral cross sections of the sub-medium regions 6a to 6h to the lateral cross section of the outer cladding area 3b are optimized. In addition, regarding the sub-medium regions on the outer side, the number of sub-medium regions arranged on the outer cladding area 3b is further optimized, such as eight of the sub-medium regions 6a to 6h described above.

The second cladding region 4 is a homogeneous layer formed with a predetermined medium, and is arranged at the outer circumference of the first cladding region 3. In this case, it is desirable that the medium of the second cladding region 4 should be a medium having a refractive index lower than the refractive index of the core region 2 consisting of, for example, the pure silica glass or the fluorine-doped silica glass, as in the case of the first cladding region 3. As a result, the second cladding region 4 can cause a refractive index difference with respect to the core region 2.

Furthermore, a coating portion (not shown) having a flexibility is arranged in a concentric manner at the outer circumference of the second cladding region 4. The coating portion prevents a damage and a strength degradation of the optical fiber 1, and at the same time, prevents optical transmission characteristics of the optical fiber 1 from being degraded by a strain caused by an external force (stress) applied to the inside of the optical fiber 1.

Figure 2:
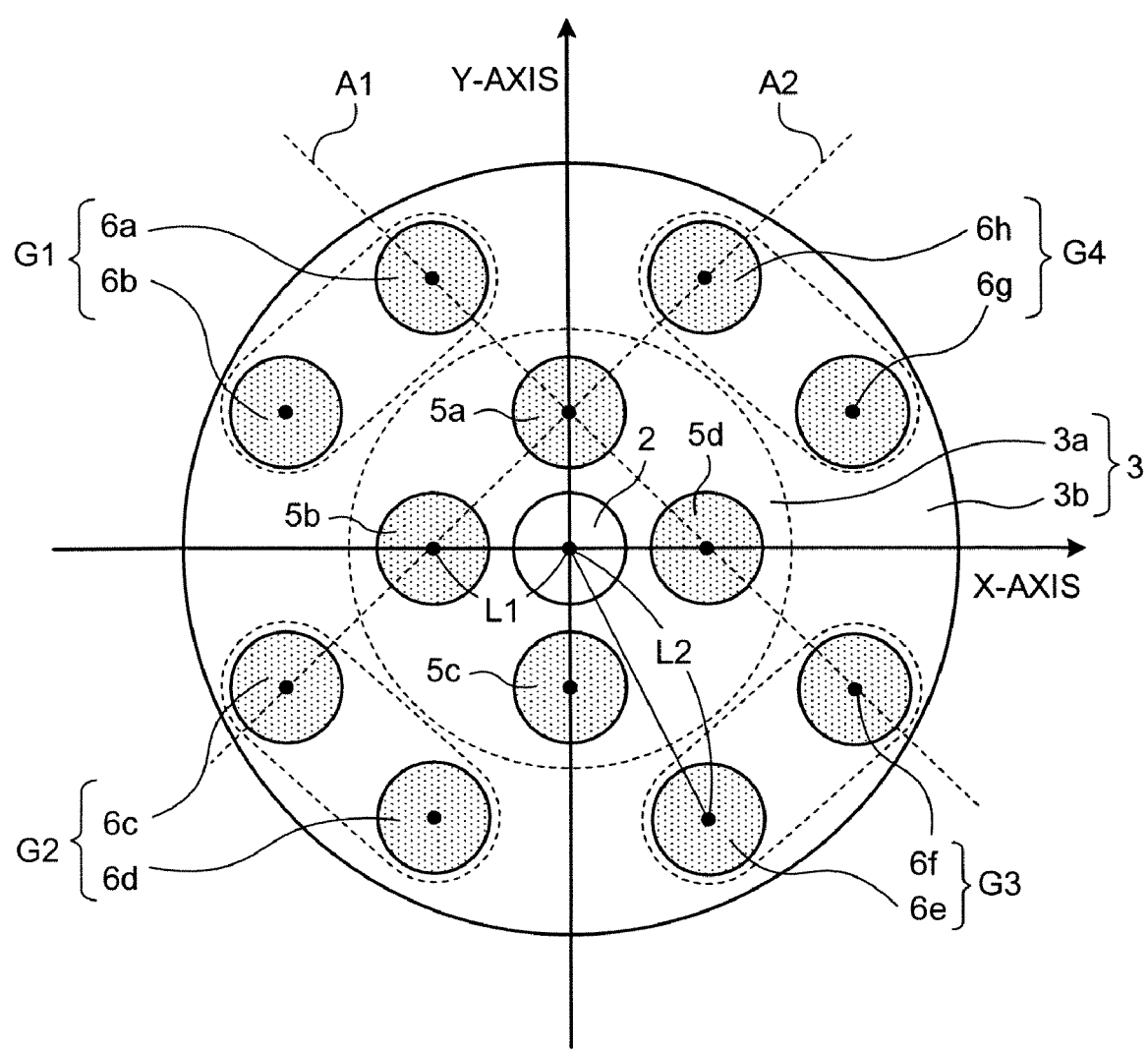
FIG. 2 is a lateral cross section of the optical fiber, illustrating an example of arranging an inner sub-medium region and an outer sub-medium region arranged in multilayer in a cladding region.

An arrangement of the sub-medium regions 5a to 5d and the sub-medium regions 6a to 6h in the first cladding region 3 will be explained below. FIG. 2 is a lateral cross section of the optical fiber 1, illustrating an example of arranging the sub-medium regions 5a to 5d on the inner side and the sub-medium regions 6a to 6h on the outer side in the first cladding region 3. As shown in FIG. 2, the sub-medium regions 5a to 5d are respectively arranged at four folds rotationally symmetric centering on the core region 2 in the inner cladding area 3a. The sub-medium groups G1 to G4 are respectively arranged at four folds rotationally symmetric centering on the core region 2 in the outer cladding area 3b.

When the sub-medium regions are arranged at each of the four folds rotational symmetry in the first cladding region 3, the centers of the lateral cross sections of the sub-medium regions are located on the two axes (e.g., the X-axis and the Y-axis shown in FIG. 2) that are parallel to the lateral cross section of the optical fiber 1, and perpendicular to each other at the center of the lateral cross section of the core region 2, and the center-to-center distances between the sub-medium regions arranged at each of the four folds rotational symmetry and the core region 2 are the same. In other words, the centers of the lateral cross sections of the sub-medium regions 5a to 5d are located on the X-axis or the Y-axis, and the center-to-center distances between the sub-medium regions 5a to 5d and the core region 2 are all identical.

On the other hand, when the sub-medium groups G1 to G4 are mutually in a positional relation of the four folds rotational symmetry in the outer cladding area 3b, the sub-medium regions 6a, 6c, 6e, and 6g are mutually in the positional relation of the four folds rotational symmetry in the outer cladding area 3b, and the rest of the sub-medium regions 6b, 6d, 6f, and 6h are mutually in the positional relation of the four folds rotational symmetry in the outer cladding area 3b. In this case, the centers of the lateral cross sections of the sub-medium regions 6a, 6c, 6e, and 6g are located on the two axes that are parallel to the lateral cross section of the optical fiber 1, and perpendicular to each other at the center of the lateral cross section of the core region 2. Furthermore, the center-to-center distances between the sub-medium regions 6a, 6c, 6e, and 6g and the core region 2 are all the same. In the same way, the centers of the lateral cross sections of the sub-medium regions 6b, 6d, 6f, and 6h are located on the two axes that are parallel to the lateral cross section of the optical fiber 1, and perpendicular to each other at the center of the lateral cross section of the core region 2. Furthermore, the center-to-center distances between the sub-medium regions 6b, 6d, 6f, and 6h and the core region 2 are all the same.

The centers of the lateral cross sections of the sub-medium regions 5a to 5d on the inner side are located on a circumference of a circle with a radius of a center-to-center distance L1 between the sub-medium regions 5a to 5d and the core region 2. In addition, the centers of the lateral cross sections of the sub-medium regions 6a, 6c, 6e, and 6g on the outer side are located on a circumference of a circle having a center at the center of the cross section of the core region 2, and the centers of the lateral cross sections of the sub-medium regions 6b, 6d, 6f, and 6h on the outer side are located on a circumference of a circle having a center at the center of the cross section of the core region 2. According to the present embodiment, the centers of the lateral cross sections of the sub-medium regions 6a to 6h are located on a circumference of a circle with a radius of a center-to-center distance L2 between the sub-medium regions 6a to 6h and the core region 2. In other words, the centers of the lateral cross sections of the sub-medium regions 5a to 5d on the inner side and the centers of the lateral cross sections of the sub-medium regions 6a to 6h on the outer side are located on each circumference of concentric circles having the center of the lateral cross section of the core region 2 (the intersection of the X-axis and the Y-axis shown in FIG. 2) as the common center, respectively. In this manner, by setting the diameters of the sub-medium regions 5a to 5d on the inner side and the sub-medium regions 6a to 6h on the outer side the same, and arranging the sub-medium regions 6a to 6h on the outer side on the same circumference of the circle, the sub-medium regions 5a to 5d and 6a to 6h can be easily arranged at each of the four folds rotational symmetry, which results in an enhancement of a manufacturing (manufacturability) of the optical fiber 1 according to the present invention.

Furthermore, it is desirable that the center of each lateral cross section of the sub-medium regions 6a to 6h is located on a line that passes the center of each lateral cross section of the sub-medium regions 5a to 5d adjacent to each other. Specifically, as shown in FIG. 2, the centers of the lateral cross sections of the sub-medium regions 6a and 6f that face each other across the inner cladding area 3a are located on a line A1 that passes the centers of the lateral cross sections of the two adjacent sub-medium regions 5a and 5d. The centers of the lateral cross sections of the sub-medium regions 6c and 6h that face each other across the inner cladding area 3a are located on a line A2 that passes the centers of the lateral cross sections of the two adjacent sub-medium regions 5a and 5b. The same goes for the rest of the sub-medium regions 6b, 6d, 6e, and 6g. In this manner, by arranging the sub-medium regions 6a to 6h on the outer side based on the sub-medium regions 5a to 5d on the inner side, it is possible to optimize the arrangement of a plurality of sub-medium regions in multilayer.

With the first cladding region 3 in which a plurality of sub-medium regions (for example, the sub-medium regions 5a to 5d on the inner side and the sub-medium regions 6a to 6h on the outer side) are arranged in multilayer in the above manner, it is possible to confine a light in the core region 2 very strongly. In other words, even when a small-diameter bending (for example, a bending with a curvature radius of equal to or larger than 5 mm and equal to or smaller than 60 mm) is formed in the optical fiber 1 including the first cladding region 3 described above, it is possible to lower a leakage of a light to the first cladding region 3. As a result, the macrobending loss can be reduced against the small-diameter bending.

The sub-medium regions 5a to 5d and the sub-medium regions 6a to 6h are respectively arranged in multilayer at four folds rotationally symmetric centering on the core region 2 in the first cladding region 3. Therefore, the refractive index profile in each axis direction of the two axes (for example, the X-axis and the Y-axis shown in FIG. 2) perpendicular to each other on the center of the lateral cross section of the core region 2 becomes mutually equivalent. For instance, in FIG. 2, the refractive index profile in a direction of the X-axis is equivalent to the refractive index profile in a direction of the Y-axis. As a result, because the anisotropy of the refractive index profile does not occur in each axis direction of the two perpendicular axes, it is possible to suppress an increase of the PMD of the optical fiber 1 having the first cladding region 3.

Furthermore, a confinement of a higher-order mode of a propagating light (hereinafter, "higher-order mode") in the core region 2 can be lowered while maintaining the confinement effect of the fundamental mode of the propagating light (hereinafter, "fundamental mode") in the core region 2, by optimizing the multilayer arrangement of the sub-medium regions 5a to 5d and 6a to 6h in the first cladding region 3. As a result, it is possible to leak the higher-order mode to the cladding region while confining the fundamental mode in the core region 2. In other words, the optical fiber 1 including the first cladding region 3 can transmit a light in a single mode (waveguide the fundamental mode alone), and at the same time, lower the macro-bending loss against the small-diameter bending and suppress the increase of the PMD.

Specifically, the optical fiber 1 having the structure described above can transmit a light in a wavelength band of, for example, equal to or longer than 1500 nm in a single mode. Therefore, the optical fiber 1 can transmit the light the wavelength band including a C band and L band. In addition, when transmitting a light having a wavelength of 1550 nm in a single mode, the optical fiber 1 has an MFD of equal to or larger than 6 μm and equal to or smaller than 11 μm, being able to decrease the macro-bending loss against a small-diameter bending with a curvature radius r of 7.5 mm to equal to or lower than 0.1 dB/m.

With the optical fiber 1 described above, it is possible to realize a transmission of a light of a shorter wavelength, a decrease of the macro-bending loss against the small-diameter bending, and the like, for example, by properly adjusting parameters according to the usage, such as the relative refractive index difference $\Delta n1$, the diameter of each of the holes (a diameter d of the holes) formed to arrange a plurality of sub-medium regions in the first cladding region 3, and the center-to-center distances L1 and L2. Specifically, the optical fiber 1 of which the parameters are operated in the above manner can transmit, for example, a light in a wavelength band of equal to or longer than 1250 nm in a single mode. With this scheme, the optical fiber 1 can transmit a light in a broad bandwidth including S-band, C-band, L-band, E-band, and O-band. In addition, when transmitting a light having a wavelength of 1550 nm in a single mode, the optical fiber 1 of which the parameters are operated in the above manner has the MFD of equal to or larger than 6 μm and equal to or smaller than 11 μm, being able to decrease the macro-bending loss against a small-diameter bending with a curvature radius r of 3.0 mm to equal to or lower than 0.1 dB/m.

The transmission of a light in a single mode is generally defined by a fact that a cut-off wavelength $\lambda c$ is shorter than an operating wavelength (a wavelength of the transmitting light). However, in the present explanation, in the optical fiber 1 transmitting a light having a wavelength $\lambda$, it is defined that the optical fiber 1 transmits the light having the wavelength $\lambda$ in a single mode when a transmission loss of all higher-order modes in the wavelength $\lambda$ is equal to or larger than 20 dB/m. It is because that, if the transmission loss of all higher-order modes of the optical fiber 1 is equal to or larger than 20 dB/m when the optical fiber 1 having a length of equal to or longer than 10 m is used, there is substantially no influence of the all higher-order modes.

Furthermore, when the transmission loss of all higher-order modes of the optical fiber 1 is equal to or larger than 20 dB/m, the definition that the optical fiber 1 transmits the light having the wavelength $\lambda$ is virtually the same as the fiber cut-off wavelength $\lambda c$ defined by the ITU-T (International Telecommunication Union-Telecommunication Standardization Sector) G.650.1. As for the rest of terminologies not specifically defined in the specification, the definition and the measurement method by the ITU-T G.650.1 or G.650.2 will be applied.

The optical fiber 1, which operates as a single mode fiber that can lower the macro-bending loss against the small-diameter bending and suppress an increase of the PMD as described above, can be installed in a local place along a wall or a pillar of an indoor, a building, or the like with a small curvature radius. Specifically, the optical fiber 1 can transmit a light in a wavelength band of equal to or longer than 1550 nm in a single mode while decreasing the macro-bending loss against the small-diameter bending to equal to or lower than 0.1 dB/m, even when the optical fiber 1 is installed in a condition in which the small-diameter bending with the curvature radius of equal to or larger than 3 mm and equal to or smaller than 60 mm is formed in a place or more. The same goes for a case in which the optical fiber 1 is rolled in a coil shape forming the small-diameter bending with the curvature radius of equal to or larger than 3 mm and equal to or smaller than 60 mm.

The macro-bending loss described above is further decreased as wavelength band of the light propagating through the optical fiber 1 becomes low. Therefore, the optical fiber 1 has the same effect when transmitting a light in a wavelength band of shorter than 1550 nm, for example, a wavelength band of equal to or longer than 1310 nm or a wavelength band of equal to or shorter than 1250 nm, as the case of transmitting the light in the wavelength band of equal to or longer than 1550 nm.

In addition, the optical fiber 1 having the MFD of equal to or larger than 6 μm and equal to or smaller than 11 μm can reduce a connection loss that occurs when connecting the optical fiber 1 to a standard SMF used in a light propagating channel (hereinafter, the standard SMF indicates a fiber corresponding to the ITU-T G.652). It is because that the MFD of the standard SMF is about 10 μm at the wavelength of 1550 nm, and is close to the MFD of the optical fiber 1 (equal to or larger than 6 μm and equal to or smaller than 11 μm). In other words, when connecting the optical fiber 1 to the standard SMF, the connection loss can be reduced as a difference between the MFD of the standard SMF and the MFD of the optical fiber 1 approaches zero. The same goes for a case in which the standard SMF and the optical fiber 1 are fusion spliced.

By using the optical fiber 1 having the effect described above, it is possible to realize an optical transmission medium in a line shape or a coil shape, which can decrease the macro-bending loss against the small-diameter bending of equal to or larger than 3 mm and equal to or smaller than 60 mm to equal to or lower than 0.1 dB/m and suppress an increase of the PMD at the same time, and can transmit a light in a wavelength of equal to or longer than 1250 nm in a single mode. Using the optical transmission medium, a waveguide or an optical device can be easily implemented, which can decrease the macro-bending loss against the small-diameter bending and suppress an increase of the PMD at the same time, and can transmit the light in the wavelength of equal to or longer than 1250 nm in a single mode.

First Embodiment Example

A method of manufacturing the optical fiber 1 according to the embodiment of the present invention will be explained below, followed by a specific explanation of an embodiment example of the optical fiber 1 manufactured based on the method. The optical fiber 1 shown in FIG. 1 is manufactured based on the manufacturing method described below.

A core region is formed by doping a dopant in a silica glass by the VAD (vapor phase axial deposition) method or the MCVD (modified chemical vapor deposition) method, and a silica glass including the core region doped with the dopant is fabricated. In this case the dopant doped in the core region is at least one of germanium and phosphorous. In addition, the relative refractive index of the core region to the pure silica glass is adjusted to 0.37%.

According to the VAD method or the MCVD method, it is possible to make a fine adjustment of the amount of the dopant to be doped in the silica glass to form the core region. As a result, it is possible to adjust the relative refractive index difference $\Delta n1$ of the core region 2 with respect to the second cladding region 4 (for example, a pure silica glass) in steps of 0.01%.

After that, a pure silica glass layer is formed (externally) on the outer circumference of the silica glass including the core region by the OVD (outside vapor deposition) method. With the above steps, a preform having an outer diameter of 40 mm and a core diameter of 3.7 mm is fabricated. In this case, the preform includes the core region and the pure silica glass portion sequentially formed in layer in a concentric manner from the center axis in the longitudinal direction toward the radial direction (outer side). The pure silica glass portion can be substituted with a fluorine-doped silica glass.

Subsequently, the silica glass portion of the preform is drilled using a mechanical drill such as an ultrasonic drill, to form a plurality of holes in the silica glass portion of the preform. In this case, the lateral cross section of the holes is substantially circular, and the holes are formed at the four folds rotational symmetry along the center axis of the core region as shown in FIG. 2. Specifically, the holes are formed one by one in parallel to the core region at each of the four folds rotational symmetry centering on the core region (each of the positions corresponding to the sub-medium regions 5a to 5d shown in FIG. 2) in the silica glass portion near the outer circumference of the core region of the preform. Subsequently, the holes are formed two by two in parallel to the core region at each of the four folds rotational symmetry centering on the core region (each of the positions corresponding to the sub-medium regions 6a to 6h) in the silica glass portion on the outer side of the silica glass portion where the four holes have been formed. Each of the holes is formed in such manner that the finishing diameter becomes 3.2 mm. After the holes are formed, a surface of the inner wall of each of the holes is polished.

The preform in which the holes are formed is drawn, to form an optical fiber. In this case, the preform is drawn in such a manner that an outer diameter of the fiber (i.e., the outer diameter of the silica glass portion formed on the outer circumference of the core region) becomes 80 μm. In this manner, a sample #1 is fabricated, which is a first embodiment example of the optical fiber 1 according to the embodiment of the present invention.

The sample #1 according to the first embodiment example has the same structure as the optical fiber 1 described above (see FIGS. 1 and 2). Specifically, the core region 2 of the sample #1 has a diameter of the lateral cross section (i.e., core diameter) of 7.4 μm and the relative refractive index difference $\Delta n1$ of 0.37% with respect to the second cladding region 4. In addition, the sub-medium regions 5a to 5d on the inner side and the sub-medium regions 6a to 6h on the outer side arranged in the first cladding region 3 of the sample #1 of a gaseous substance (e.g., air) that fills an internal space of the holes. In this case, each of the lateral cross sections of the sub-medium regions 5a to 5d and 6a to 6h (i.e., the lateral cross sections of the holes) is in a substantially circular shape, and the dimension of each of the lateral cross sections is substantially same. The diameter of each of the lateral cross sections of the sub-medium regions is 6.4 μm.

The center-to-center distance L1 between the sub-medium regions 5a to 5d on the inner side and the core region 2 of the sample #1 is 7.7 μn. The center of each of the lateral cross sections of the sub-medium regions 5a to 5d on the inner side is located on the circumference of a circle centering on the core region 2 with a radius of the center-to-center distance L1.

On the other hand, the center-to-center distance L2 between the sub-medium regions 6a to 6h on the outer side and the core region 2 of the sample #1 is 16.435 μm. The center of each of the lateral cross sections of the sub-medium regions 6a to 6h on the outer side is located on the circumference of a circle centering on the core region 2 with a radius of the center-to-center distance L2, i.e., a circle with a radius of the center-to-center distance L2 concentric with the circle passing the center of each of the lateral cross sections of the sub-medium regions 5a to 5d on the inner side. In addition, as shown in FIG. 2, the center of each of the lateral cross sections of the sub-medium regions 6a to 6h is located on a line passing the centers of the lateral cross sections of the two adjacent sub-medium regions from among the sub-medium regions 5a to 5d on the inner side.

The sample #1 having the above structure has characteristics, for example, shown in FIG. 3. As shown in FIG. 3, the cut-off wavelength $\lambda c$ of the sample #1 is 1280 nm. Therefore, the sample #1 can transmit a light in a wavelength band of equal to or longer than 1280 nm, for example, a light in a wavelength band of 1.3 μm (1280 nm to 1330 nm) and a light in a wavelength band of 1.55 μm (1530 nm to 1565 nm) in a single mode. The sample #1, which is a single mode fiber described above, has a wavelength dispersion of 33.5 ps/nm/km and a dispersion slope of 0.0726 $ps/nm^2/km$ when transmitting a light having a wavelength of 1550 nm.

When transmitting a light having a wavelength of 1550 nm, the sample #1 can reduce the macro-bending loss against a small-diameter bending with a curvature radius r=7.5 mm to 0.01 dB/m, and the macro-bending loss against a small-diameter bending with a curvature radius r=5.0 mm to 0.09 dB/m. As described above, the macro-bending loss against the small-diameter bending is equal to or smaller than 0.1 dB/m, with a considerably small increase of loss caused by the small-diameter bending.

Furthermore, the sample #1 can reduce the PMD to 0.06 ps/km1/2, when transmitting a light having a wavelength of 1550 nm. As a result, the sample #1 can suppress an increase of the PMD, and prevent a degradation of a light transmission and an occurrence of a noise caused by the increase of the PMD.

In addition, when transmitting a light having a wavelength of 1550 nm, the sample #1 has the MFD of 6.9 μm. Since the sample #1 has the MFD close to the MFD of the standard SMF (about 10 μm), the sample #1 can reduce the connection loss caused when it is connected to the standard SMF (e.g., a mechanical connection using a mechanical splice or a fusion splice), as well as suppress the nonlinear phenomena occurring in the optical fiber.

Although the sample #1 is fabricated by drawing the preform with the outer diameter of 40 mm to make an optical fiber with a cladding diameter of 80 μm according to the first embodiment example, the present invention is not limited to this scheme, but the sample #1 can be fabricated by changing the cladding diameter in a range between 50 μm and 150 μm according to the usage. For instance, when fabricating the sample #1 with a cladding diameter of 125 μm, the preform is fabricated with the outer diameter of 62.5 mm and the core diameter of 3.7 mm, based on the above manufacturing method, and a plurality of holes (a diameter of 3.2 mm) are formed in the silica glass portion of the preform. After that, by drawing the preform to be the optical fiber with the cladding diameter of 125 μm, the sample #1 having the cladding diameter of 125 μm can be fabricated. The sample #1 having the cladding diameter of 125 μm has virtually same characteristics as the sample #1 having the cladding diameter of 80 μm (see FIG. 3).

Second Embodiment Example

A second embodiment example of the optical fiber 1 according to the embodiment of the present invention is explained below. According to the second embodiment example, samples #2 to #9 are explored, which are fabricated by increasing or decreasing at least one of the relative refractive index difference Δn1 and the diameter of the sub-medium regions (i.e., the diameter d of the holes) of the sample #1 that is the first embodiment example of the optical fiber 1, based on the manufacturing method of the optical fiber 1 described above.

Specifically, the relative refractive index difference Δn1 of the samples #2 and #3 is set to the same value (Δn1=0.37%) as that of the sample #1 that is the first embodiment example, the relative refractive index difference Δn1 of the samples #4 and #6 is set to a lower value (Δn1=0.33%), compared to the sample #1 that is the first embodiment example, and the relative refractive index difference Δn1 of the samples #7 and #9 is set to a higher value (Δn1=0.40%), compared to the sample #1 that is the first embodiment example. Furthermore, the diameter d of the holes of the samples #4 and #7 is set to the same value (d=6.4 μm) as that of the sample #1 that is the first embodiment example, the diameter d of the holes of the samples #2, #5, and #8 is set to a small value (d=6.0 μm) compared to the sample #1 that is the first embodiment example, and the diameter d of the holes of the samples #3, #6, and #9 is set to a larger value (d=6.8 μm) compared to the sample #1 that is the first embodiment example. Other than the relative refractive index difference Δn1 and the diameter d of the holes, the samples #2 to #9 according to the second embodiment example have the same configuration as the sample #1 according to the first embodiment example.

The samples #2 to #9 according to the second embodiment example have characteristics, for example, shown in FIG. 4. As shown in FIG. 4, the samples #2 to #9 can transmit a light in a wavelength band of equal to or longer than 1550 nm in a single mode, and at the same time, reduce the macro-bending loss against a small-diameter bending with a curvature radius r=7.5 mm to equal to or smaller than 0.1 dB/m. In addition, when transmitting a light having a wavelength of 1550 nm, the samples #2 to #9 have the MFD equivalent to or larger than that of the sample #1 according to the first embodiment example.

The lowest higher-order mode transmission loss shown in FIG. 4 is a transmission loss of a lowest order of higher-order modes (for example, when the higher-order modes include from a first-order mode to a third-order mode, the lowest higher-order mode is the first-order mode) in a propagation of a light having a predetermined wavelength.

In the samples #2 to #9, the sub-medium regions $5a$ to $5d$ and $6a$ to $6h$ are arranged in multilayer at four folds rotationally symmetric centering on the core region 2 in the first cladding region 3. Therefore, the samples #2 to #9 can reduce the PMD as in the case of the sample #1.

Furthermore, the sample #2, in which the diameter d of the holes is set to a smaller value compared to the sample #1, can lower the confinement of the higher-order mode light in the core region 2, compared to the sample #1. As a result, as shown in FIG. 4, the sample #2 can transmit a light in a wavelength band of equal to or longer than 1250 nm in a single mode. In addition, the MFD of the sample #2 can be made larger compared to the sample #1, and as a result, it can be even closer to the MFD of the standard SMF (about 10 μm).

On the other hand, the sample #3, in which the diameter d of the holes is set to a larger value compared to the sample #1, as shown in FIG. 4, although it is difficult to propagate a light having a wavelength of 1250 nm, the lowest higher-order mode transmission loss when transmitting a light having a wavelength of 1290 nm is equal to or larger than 20 dB/m. Therefore, the sample #3 can transmit a light in a wavelength band of equal to or longer than 1290 nm (for example, a light in a wavelength band of 1.3 μm) in a single mode. In addition, when transmitting a light having a wavelength of 1550 nm, the sample #3 can reduce the macro-bending loss against a small-diameter bending with a curvature radius r=5 mm to equal to or smaller than 0.1 dB/m (specifically, to 0.0317 dB/m). Therefore, the structure of the sample #3 is an effective structure for reducing the macro-bending loss compared to the sample #1.

The samples #4 to #6, in which the relative refractive index difference Δn1 is set to a smaller value compared to the sample #1, can lower the confinement of the higher-order mode light in the core region 2, compared to the sample #1. As a result, as shown in FIG. 4, the samples #4 to #6 can transmit a light in a wavelength band of equal to or longer than 1250 nm in a single mode. the sample #6, in which the relative refractive index difference Δn1 is set to a smaller value and the diameter d of the holes is set to a larger value compared to the sample #1, can transmit a light in a wavelength band of equal to or longer than 1250 nm in a single mode, and at the same time, reduce the macro-bending loss against a small-diameter bending with a curvature radius r=7.5 mm to equal to or smaller than 0.1 dB/m (specifically, to 0.083 dB/m).

In addition, as shown in FIG. 4, the samples #7 to #9, in which the relative refractive index difference Δn1 is set to a larger value compared to the sample #1, can transmit a light in a wavelength band of equal to or longer than 1550 nm in a single mode. The samples #7 to #9 can reduce the macro-bending loss against a small-diameter bending with a curvature radius r=7.5 mm, compared to the samples #1 to #5. For instance, the samples #7 to #9 can reduce an increase of loss due to the macro-bending loss to about a half of that of the samples #1 to #3. In particular, the samples #7 and #9, in which the relative refractive index difference Δn1 is set to a larger value and the diameter of the holes is set to the same value or a larger value compared to the sample #1, can transmit a light in a wavelength band of equal to or longer than 1500 nm, and at the same time, reduce the macro-bending loss against a small-diameter bending with a curvature radius r=5 mm to equal to or smaller than 0.1 dB/m.

As described with the samples #2 to #9, the optical fiber according to the embodiment of the present invention can realize a transmission of a light of a shorter wavelength, a reduction of the macro-bending loss against even smaller-diameter bending, and an increase of the MFD by properly adjusting at least one of the relative refractive index difference $\Delta n1$ and the diameter d of the holes.

As can be seen from the characteristics of the samples #2 to #9, for example, when fabricating the sample #1 according to the first embodiment example, even if there is a structure fluctuation such as the relative refractive index difference $\Delta n1$ (0.33% to 0.40%) and the diameter d of the holes (6.0 μm to 6.8 μm) shown in FIG. 4 in the relative refractive index difference $\Delta n1$ (=0.37%) and the diameter d of the holes (=6.4 μm) of the sample #1, the cut-off wavelength of the optical fiber 1 does not become extremely longer, and the macro-bending loss does not increase. In other words, even when there is a deviation in the design structure by the amount shown in the samples #2 to #9, the optical fiber 1 according to the embodiment of the present invention can transmit a light in a wavelength band of equal to or longer than 1550 nm while suppressing an increase of the PMD, and at the same time, reduce the macro-bending loss against a small-diameter bending with a curvature radius r=7.5 mm to equal to or smaller than 0.1 dB/m. Therefore, it can be said that a tolerance range of the structure fluctuation in fabrication of the optical fiber 1 is large.

The samples #2 to #9 according to the second embodiment example can be fabricated by drawing the preform in such a manner that an outer diameter of the cladding region becomes 50 μm to 150 μm, as in the case of the sample #1 according to the first embodiment example. The samples #2 to #9 with the cladding diameter changed have virtually same characteristics as the samples #2 to #9 having the cladding diameter of 80 μm (see FIG. 4).

Third Embodiment Example

A third embodiment example of the optical fiber 1 according to the embodiment of the present invention is explained below. According to the second embodiment example, samples #10 to #19 are explored, which are fabricated by changing the diameter d of the holes and the center-to-center distances L1 and L2 of the sample #1 that is the first embodiment example of the optical fiber 1, based on the manufacturing method of the optical fiber 1 described above. Specifically, the diameter d of the holes and the center-to-center distances L1 and L2 of the samples #10 to #19 according to the third embodiment example are set to larger values compared to the sample #1 according to the first embodiment example. Other than the diameter d of the holes and the center-to-center distances L1 and L2, the samples #10 to #19 have the same configuration as the sample #1 according to the first embodiment example.

The samples #10 to #19 according to the third embodiment example have characteristics, for example, shown in FIG. 5. As shown in FIG. 4, when transmitting a light having a wavelength of 1550 nm, the samples #10 to #19 can reduce the macro-bending loss against a small-diameter bending with a curvature radius r=7.5 mm to equal to or smaller than 0.1 dB/m, having the MFD of equal to or larger than 6 μm and equal to or smaller than 11 μm.

In the samples #10 to #19, the sub-medium regions 5a to 5d and 6a to 6h are arranged in multilayer at four folds rotationally symmetric centering on the core region 2 in the first cladding region 3. Therefore, the samples #10 to #19 can reduce the PMD as in the case of the sample #1.

With the samples #10 and #11, as shown in FIG. 5, although it is difficult to propagate a light having a wavelength of 1250 nm, the lowest higher-order mode transmission loss when transmitting a light having a wavelength of 1300 nm is equal to or larger than 20 dB/m. Therefore, the samples #10 and #11 can transmit a light in a wavelength band of equal to or longer than 1300 nm (for example, a light having a wavelength of 1310 nm) in a single mode. In particular, when transmitting a light having a wavelength of 1550 nm, the sample #11 can reduce the macro-bending loss against a small-diameter bending with a curvature radius r=5 mm to equal to or smaller than 0.1 dB/m. Therefore, a structure of the sample #11 is an effective structure for reducing the macro-bending loss.

On the other hand, the samples #12 to #19 can lower the confinement of the higher-order mode light in the core region 2 compared to the sample #1, by setting the diameter d of the holes and the center-to-center distances L1 and L2 compared to the sample #1. As a result, as shown in FIG. 5, the samples #12 to #19 can transmit a light in a wavelength band of equal to or longer than 1250 nm in a single mode.

With the samples #10 to #19, which are fabricated by properly adjusting the diameter d of the holes and the center-to-center distances L1 and L2 as shown in FIG. 5, it is possible to make the MFD larger compared to the sample #1 according to the first embodiment example. Specifically, the MFD of the samples #10 to #19 can be made to equal to or larger than 8.5 μm as shown in FIG. 5, which can be even closer to the MFD of the standard SMF (about 10 μm). As a result, it is possible to reduce a mismatching of the MFD when connecting the optical fiber 1 represented by the samples #10 to #19 to the standard SMF, and to reduce the connection loss caused when connecting the optical fiber 1 to the standard SMF by a mechanical splice or a fusion splice). In addition, the samples #10 to #19 can suppress the nonlinear phenomena occurring in the optical fiber, compared to the sample #1 according to the first embodiment example.

The samples #10 to #19 according to the third embodiment example can be fabricated by drawing the preform in such a manner that an outer diameter of the cladding region becomes 50 μm to 150 μm, as in the case of the sample #1 according to the first embodiment example. The samples #10 to #19 with the cladding diameter changed have virtually same characteristics as the samples #2 to #9 having the cladding diameter of 80 μm (see FIG. 5).

Fourth Embodiment Example

Figure 6:
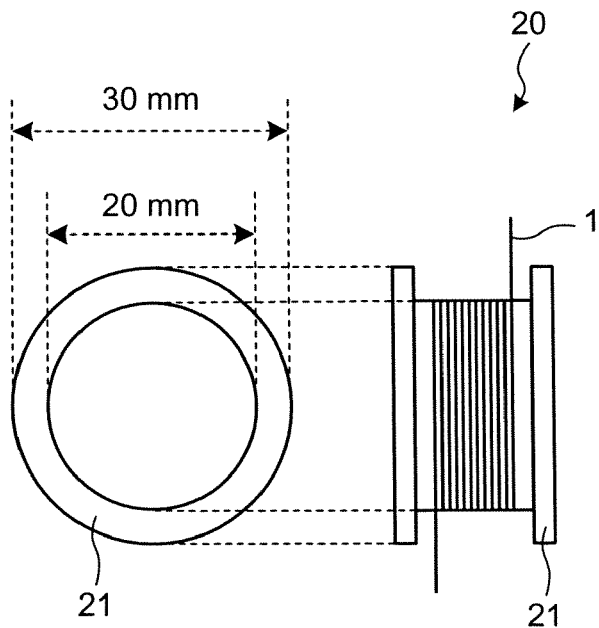
FIG. 6 is a schematic diagram illustrating an example of configuration of an optical transmission medium as a fourth embodiment example of the present invention.

An optical transmission medium according to the embodiment of the present invention is explained below. In a fourth embodiment example, an embodiment example of the optical transmission medium that is formed by rolling the optical fiber 1 in a coil shape is explained. FIG. 6 is a schematic diagram illustrating an example of configuration of the optical transmission medium according to the fourth embodiment example of the present invention. As shown in FIG. 6, an optical transmission medium 20 according to the fourth embodiment example includes the optical fiber 1 according to the embodiment of the present invention and a compact-sized bobbin 21.

The bobbin 21 includes a guard portion that restricts a range of a winding portion on which the optical fiber 1 is wound at both sides of the winding portion. A diameter of the guard portion is 30 mm. A diameter of the winding portion of the bobbin 21 is 20 mm. The optical fiber 1 has the same structure and the same characteristics as the sample #1 according to the first embodiment example. A length of the optical fiber is, for example, 200 m. The optical transmission medium 20 according to the fourth embodiment example is formed by winding the optical fiber 1 on the winding portion of the bobbin 21.

The optical fiber 1 (for example, the sample #1 according to the first embodiment example) used for the optical transmission medium 20 can transmit a light in a wavelength band of equal to or longer than 1280 nm in a single mode while decreasing the macro-bending loss against a small-diameter bending to equal to or lower than 0.1 dB/m, even when the optical fiber 1 is rolled in a coil shape with a small-diameter bending with a curvature radius of equal to or larger than 3 mm and equal to or smaller than 60 mm. When the optical fiber 1 represented by the samples #2 to #9 according to the second embodiment example of the samples #10 to #19 according to the third embodiment examples is used, it is possible to transmit a light in a wavelength band of equal to or longer than 1250 nm in a single mode while decreasing the macro-bending loss against the small-diameter bending to equal to or lower than 0.1 dB/m.

The macro-bending loss of the optical fiber 1 does not show any difference between conditions before and after being wound on the bobbin 21, and an amount of loss increase caused by the macro-bending loss of the optical fiber 1 wound in a coil shape is virtually zero (below measurement limit). In addition, the optical fiber 1 rolled in a coil shape can suppress an increase of the PMD as in the case before being wound in the coil shape.

A size of the optical transmission medium 20 using the optical fiber 1 can be easily made compact, and it is possible to transmit a light in a wavelength band of equal to or longer than 1250 nm in a single mode while decreasing the macro-bending loss to equal to or lower than 0.1 dB/m against the small-diameter bending with a curvature radius of equal to or larger than 3 mm and equal to or smaller than 60 mm and suppressing an increase of the PMD at the same time. By connecting the standard SMF (e.g., a single mode fiber of a backbone system) and the like to the optical fiber 1 of the optical transmission medium 20, which is in a coil shape, a compact size in an equipment scale can be expedited, and at the same time, it is possible to realize various optical devices that can transmit a light in a wavelength band of equal to or longer than 1250 nm in a single mode while decreasing the macro-bending loss against the small-diameter bending and suppressing an increase of the PMD with ease.

Fifth Embodiment Example

Figure 7:
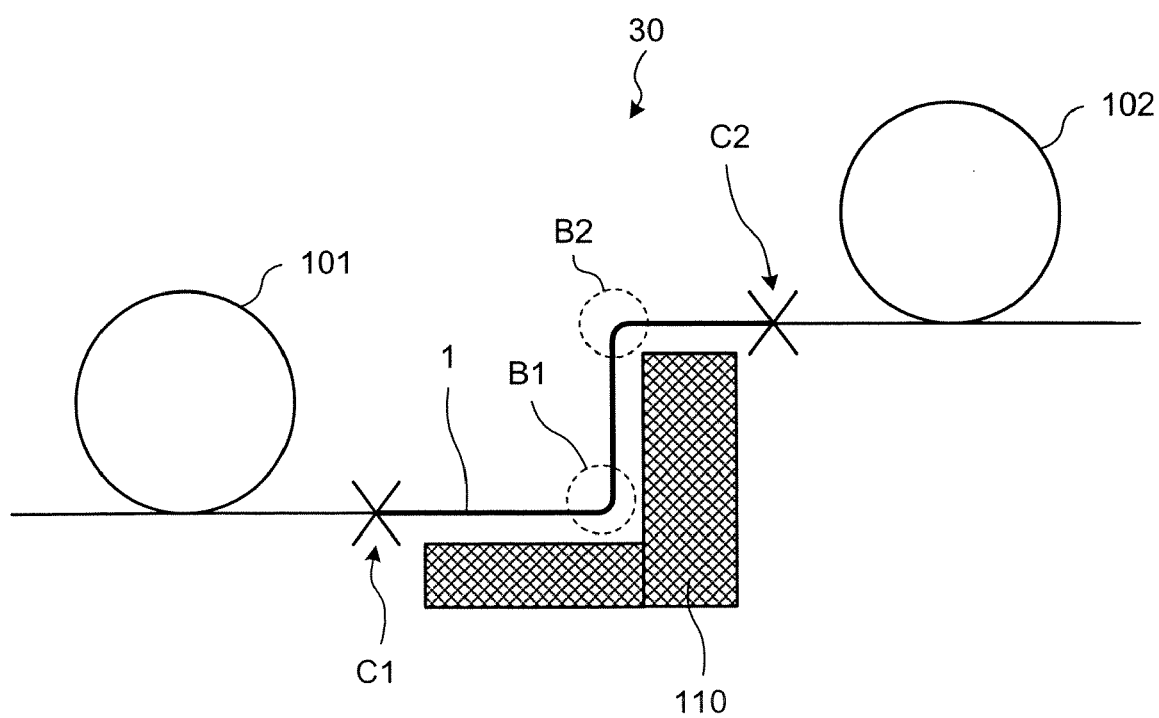
FIG. 7 is a schematic diagram illustrating an example of configuration of an optical transmission medium as a fifth embodiment example of the present invention.

A fifth embodiment example of the optical transmission medium according to the embodiment of the present invention will be explained below. In the fifth embodiment example, an embodiment example of the optical transmission medium that forms a waveguide by connecting a standard SMF (an optical fiber of a backbone system) to both ends of the optical fiber 1 will be explained. FIG. 7 is a schematic diagram illustrating an example of configuration of the optical transmission medium according to the fifth embodiment example of the present invention. As shown in FIG. 7, an optical transmission medium 30 according to the fifth embodiment example is implemented by connecting optical fibers 101 and 102 of a backbone system to both ends of the optical fiber 1 according to the embodiment of the present invention.

The optical fiber 1 is one of the first to the third embodiment examples described above, and the optical fiber 101 and 102 of the backbone system are connected to both ends of the optical fiber 1. The optical fiber 101 and 102 of the backbone system are the standard SMFs described above. In this case, the optical fiber 101 of the backbone system is connected to the optical fiber 1 at a connecting portion C1, and the optical fiber 102 of the backbone system is connected to the optical fiber 1 at a connecting portion C2.

The optical transmission medium 30 having the above configuration is arranged in such a manner that the optical fiber 1 is installed along a surface of an obstacle 110, as shown in FIG. 7. In this case, the optical fiber 1 is laid on the obstacle 110, forming bending portions B1 and B2 shown in FIG. 7. The optical fiber 1 is bent at a substantially right angle while forming a small-diameter bending with a curvature radius r of 5 mm at each of the bending portions B1 and B2.

When a standard SMF (e.g., any one of the optical fibers 101 and 102 of the backbone system) is laid on the obstacle 110 instead of the optical fiber 1 of the optical transmission medium 30, and when transmitting a light having a wavelength of 1550 nm through the standard SMF, about 5 dB of macro-bending loss occurs at each of the bending portions B1 and B2 that are formed on the standard SMF. In other words, a total of about 10 dB of macro-bending loss occurs at two places of the bending portions B1 and B2. As a result, a transmission loss of a light becomes considerably large in the whole backbone system.

On the other hand, when transmitting a light having a wavelength of 1550 nm through the optical transmission medium 30 in which the optical fiber 1 is installed along the obstacle 110, an amount of loss increase caused by the macro-bending loss at the bending portions B1 and B2 is virtually zero (below measurement limit), and it is possible to reduce the macro-bending loss at the bending portions B1 and B2 to equal to or smaller than 0.1 dB. Furthermore, a connection loss caused by a connection (a mechanical splice or a fusion splice) between the optical fibers 101 and 102 of the backbone system and the optical fiber 1 at the connecting portions C1 and C2 is equal to or smaller than 0.1 dB. Therefore, a harmful effect due to the connection loss is low.

The optical transmission medium 30 having the above configuration can implement a waveguide that can suppress an increase of PMD while reducing the macro-bending loss even when the optical fiber 1 is installed, for example, along an obstacle that causes the bending portions B1 and B2, and can transmit a light in a wavelength band of equal to or longer than 1250 nm in a single mode. The waveguide formed with the optical transmission medium 30 can greatly suppress a transmission loss of a light in the whole backbone system, compared to a waveguide formed with the standard SMF (e.g., the optical fibers 101 and 102 of the backbone system) alone.

Figure 8:
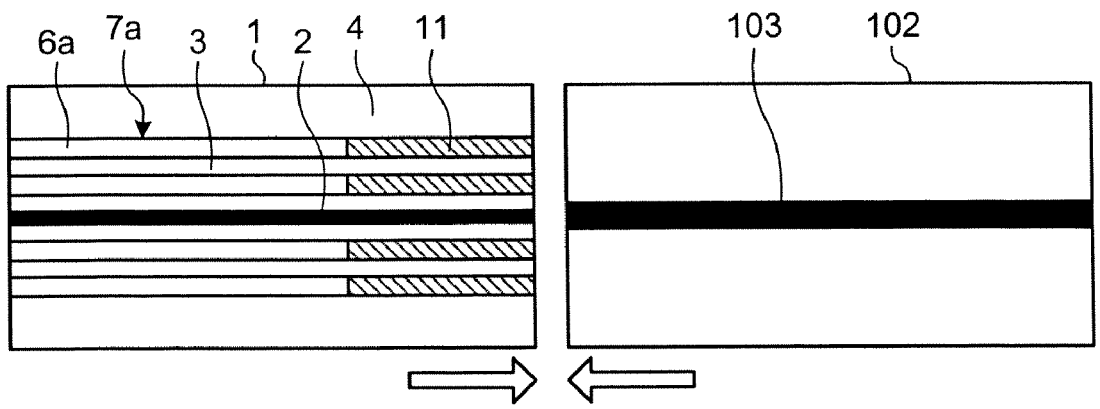
FIG. 8 is a schematic diagram illustrating an example of a method of connecting the optical fiber according to the embodiment of the present invention and a standard SMF.

The connection of the optical fiber 1 and the standard SMF (e.g., the optical fibers 101 and 102 of the backbone system) at the connecting portions C1 and C2 will be explained below. FIG. 8 is a schematic diagram illustrating an example of a method of connecting the optical fiber 1 according to the embodiment of the present invention and the standard SMF. An example of a connection method when connecting the optical fiber 1 of the optical transmission medium 30 according to the fifth embodiment example and the optical fiber 102 of the backbone system at the connecting portion C2 is shown in FIG. 8.

As shown in FIG. 8, the optical fiber 1 of the optical transmission medium 30 is connected to the optical fiber 102 of the backbone system, in a condition in which the end portions of the holes formed in the first cladding region 3 (i.e., the holes in which the sub-medium regions 5a to 5d and 6a to 6h are filled) are sealed by a refractive-index matching agent 11. Specifically, the refractive-index matching agent 11 is filled in spaces of the end portions of the holes of the optical fiber 1, to seal the end portions of the holes. After that, the end portion of the optical fiber 1 with the end portions of the holes sealed is connected to an end portion of the optical fiber 102 of the backbone system. In this case, the optical fiber 1 and the optical fiber 102 of the backbone system are fusion spliced or mechanically spliced by butt jointing the optical fiber 1 with the optical fiber 102 of the backbone system in such a manner that the center axis of the core region 2 is brought in line with the center axis of a core region 103 of the optical fiber 102 of the backbone system.

The refractive-index matching agent 11 filled in the end portions of the holes is a resin agent having a high viscosity, such as a grease, with a refractive index of 1.44 with respect to a light having a wavelength of 1550 nm. By filling the refractive-index matching agent 11 in the end portions of the holes, it is possible to make the refractive index of the end portions of the first cladding region 3 where the holes are formed close to the refractive index of the second cladding region 4 that is homogeneous. After all, the MFD at the end portion of the optical fiber 1 is enlarged, and becomes close to the value of the MFD of the optical fiber 102 of the backbone system. Furthermore, the refractive index at the end portion of the cladding region 8 consisting of the first cladding region 3 and the second cladding region 4 becomes substantially uniform. As a result, a connection loss caused by a Fresnel reflection can be reduced, and at the same time, it is possible to reduce the connection loss at the connecting portion C2, compared to a case in which the holes are not sealed. A result of measurements shows that the connection loss at the connecting portion C2 formed by the above connection method is equal to or smaller than 0.1 dB.

In addition, by sealing the end portions of the holes by the refractive-index matching agent 11, it is possible to prevent a foreign substance such as a dust from entering the internal space of the holes (or inside of the sub-medium regions) when connecting the optical fiber 1 and the optical fiber 102 of the backbone system. For instance, by filling the refractive-index matching agent 11 in the end portion of a hole 7a, it is possible to prevent the foreign substance from entering the internal space of the hole 7a, i.e., inside of the sub-medium region 6a.

Figure 9:
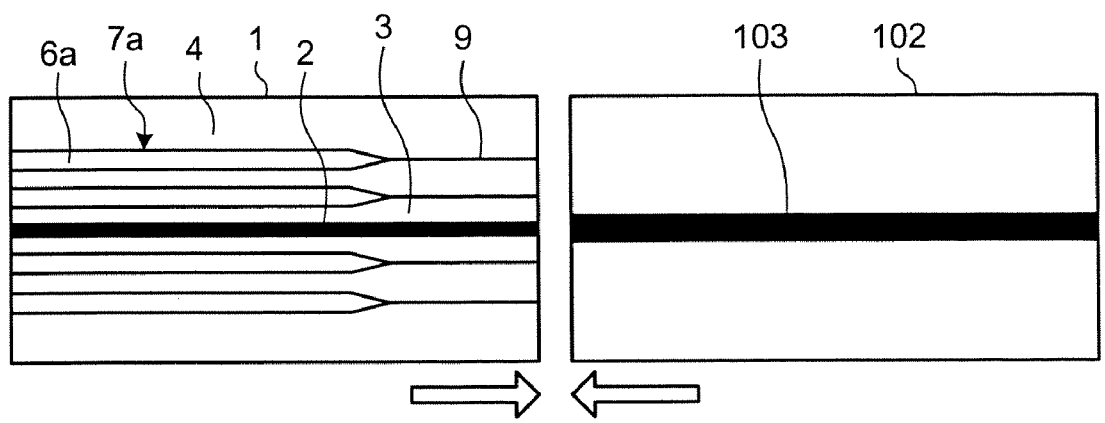
FIG. 9 is a schematic diagram illustrating an example of another method of connecting the optical fiber according to the embodiment of the present invention and a standard SMF.

Other method of connecting the optical fiber 1 and the optical fiber 102 of the backbone system will be explained below. In the method of connecting the optical fiber 1 and the optical fiber 102 of the backbone system, the method of sealing the end portions of the holes of the optical fiber 1 is not limited to the filling of the refractive-index matching agent 11 in the end portions of the holes, but can be collapsing of the end portions of the holes. FIG. 9 is a schematic diagram illustrating an example of the other method of connecting the optical fiber 1 according to the embodiment of the present invention and a standard SMF. An example of a connection method when connecting the optical fiber 1 of the optical transmission medium 30 according to the fifth embodiment example and the optical fiber 102 of the backbone system at the connecting portion C2 in the same manner as the FIG. 8 is shown in FIG. 9.

As shown in FIG. 9, the optical fiber 1 of the optical transmission medium 30 is connected to the optical fiber 102 of the backbone system, in a condition in which the end portions of the holes formed in the first cladding region 3 (i.e., the holes in which the sub-medium regions 5a to 5d and 6a to 6h are filled) are closed by collapsing the end portions. Specifically, the end portions of the holes of the optical fiber 1 are collapsed by a heating process, to close the end portions of the holes. After that, the end portion of the optical fiber 1 with the end portions of the holes closed (i.e., in a condition in which a closed portion 9 is formed) is connected to an end portion of the optical fiber 102 of the backbone system. In this case, the optical fiber 1 and the optical fiber 102 of the backbone system are fusion spliced or mechanically spliced by butt jointing the optical fiber 1 with the optical fiber 102 of the backbone system in such a manner that the center axis of the core region 2 is brought in line with the center axis of the core region 103 of the optical fiber 102 of the backbone system.

By forming the closed portion 9 at the end portions of the holes as described above, it is possible to make the refractive index of the end portions of the first cladding region 3 close to the refractive index of the second cladding region 4 that is homogeneous. With this scheme, it is possible to obtain the same operation effect as the case in which the refractive-index matching agent 11 is filled in the end portions of the holes. Therefore, a connection loss caused by a Fresnel reflection can be reduced, and at the same time, it is possible to reduce the connection loss at the connecting portion C2, compared to a case in which the holes are not closed. A result of measurements shows that the connection loss at the connecting portion C2 formed by the above connection method is equal to or smaller than 0.1 dB.

When performing a fusion splice of the optical fiber 1 with the end portions of the holes collapsed and the optical fiber 102 of the backbone system, a discharging power to perform the fusion slicing at the end portions of the optical fiber 1 and the optical fiber 102 of the backbone system is set to be extremely low, and a discharging time is set to be long. In this manner, the fusion slicing is performed by slowly collapsing the end portions of the holes. It is to prevent a cavity or a defect portion from occurring at the end portion of the optical fiber 1 because, if a high power is abruptly discharged at the end portion of the optical fiber 1, each of the holes is expanded and disrupted, which causes the cavity or the defect portion at the end portion of the optical fiber 1.

The two connection method described above is not limited to the connection of the optical fiber 1 and the optical fiber 102 of the backbone system at the connecting portion C2, but can be applied to a connection of the optical fiber 1 and the optical fiber 101 of the backbone system at the connecting portion C1. In other words, by connecting the optical fiber 1 and the optical fiber 101 of the backbone system based on any one of the two connection method, a connection loss caused by a Fresnel reflection can be reduced, and at the same time, it is possible to reduce the connection loss at the connecting portion C2, compared to a case in which the holes are not sealed, in the same manner as the case of the connecting portion C2. The same goes for a case in which the standard SMF is connected to both ends of the optical fiber 1 of the optical transmission medium 20 according to the fourth embodiment example.

As described above, according to the embodiment of the present invention, at least one sub-medium region having a refractive index lower than that of a main-medium region is arranged at each of four folds rotationally symmetric centering on the core region in the cladding region that is formed on the outer circumference of the core region, and a plurality of sub-medium regions mutually in a positional relation of the four folds rotational symmetry are arranged in multilayer in the cladding region. With this scheme, it is possible to lower the confinement of the higher-order mode light while maintaining the confinement effect of the fundamental mode light in the core region, and even out the refractive index profile in each axis direction of the two axes perpendicular to each other on the center of the lateral cross section of the core region.

Therefore, it is possible to leak the higher-order mode light to the cladding region while confining the fundamental mode light in the core region, without anisotropy in the refractive index profile in each axis direction of two perpendicular axes parallel to the later cross section. As a result, it is possible to realize an optical fiber that can reduce the macro-bending loss against a small-diameter bending with a curvature radius r=7.5 mm or r=5.0 mm to equal to or smaller than 0.1 dB/m and suppress an increase of the PMD at the same time, and transmit a light in a wavelength band of equal to or longer than 1250 nm in a single mode.

Furthermore, because the MFD of the optical fiber according to the present invention can be set to equal to or larger than 6 μm and equal to or smaller than 11 μm, it is possible to make the MFD of the optical fiber close to the MFD of a standard SMF. As a result, it is possible to reduce the connection loss caused when connecting the optical fiber according to the present invention to the standard SMF.

Moreover, centers of the lateral cross sections of the sub-medium regions on the inner side and the sub-medium regions on the outer side arranged in the cladding region in multilayer are respectively located on concentric circles having the center of the lateral cross section of the core region as the common center. Therefore, the sub-medium regions on the inner side and the sub-medium regions on the outer side can be easily arranged at each position of the four folds rotational symmetry. As a result, it is possible to enhance a manufacturing (manufacturability) of the optical fiber according to the present invention.

Furthermore, because the sub-medium regions are arranged at each position of the four folds rotational symmetry, it is possible to fabricate easier than the convention optical fiber having a microstructure of the six folds rotational symmetry. Specifically, with the optical fiber having the microstructure of the four folds rotational symmetry according to the present invention, it is necessary to make a total lateral cross section of the sub-medium regions arranged in the cladding region (i.e., a total lateral cross section of the holes formed to placed the sub-medium regions) similar to that of the conventional optical fiber, to obtain an equivalent effect as the effect of reducing the macro-bending loss by the conventional optical fiber having the microstructure of the six folds rotational symmetry. In this case, the lateral cross section of each of the sub-medium regions arranged in the optical fiber according to the present invention (i.e., the lateral cross section of each of the holes for placing the sub-medium regions) is larger than that of the microstructure of the six folds rotational symmetry. As a result, a control of the positional precision and the hole-diameter can be performed easily when forming the holes in the cladding region, and the optical fiber according to the present invention can be easily manufactured compared to the microstructure of the six folds rotational symmetry.

Moreover, by using the optical fiber according to the present invention, it is possible to implement an optical transmission medium in a line shape or a coil shape that can reduce the macro-bending loss against a small-diameter bending with a curvature radius of equal to or larger than 3 mm and equal to or smaller than 60 mm to equal to or smaller than 0.1 dB/m and suppress an increase of the PMD at the same time, and transmit a light in a wavelength band of equal to or longer than 1250 nm in a single mode.

By using the optical transmission medium according to the present invention, a compact size in an equipment scale or in a system scale can be expedited, and at the same time, it is possible to realize a waveguide or an optical device that can transmit a light in a wavelength band of equal to or longer than 1250 nm in a single mode while decreasing the macro-bending loss against the small-diameter bending and suppressing an increase of the PMD with ease.

Although a silica glass doped with a dopant or a pure silica glass is used as the main medium of the core region and the cladding region of the optical fiber according to the embodiment and the first to the fifth embodiment examples of the present invention, the present invention is not limited to this scheme, but a synthetic resin such as an optically transparent plastic can be used as the main medium.

Furthermore, although a gaseous substance such as the air, a liquid, or a solid substance is used as the sub-medium regions arranged in the cladding region according to the embodiment and the first to the fifth embodiment examples of the present invention, the present invention is not limited to this scheme, but a silica glass or an optically transparent plastic can be used as the sub-medium regions.

Although two sub-medium regions are respectively arranged at each position of the four folds rotational symmetry in the outer cladding area 3b according to the embodiment of the present invention and the first to fifth embodiment examples, the present invention is not limited to this scheme, but a single sub-medium region or more than two sub-medium regions can be respectively arranged each position of the four folds rotational symmetry in the outer cladding area 3b.

Furthermore, although the centers of the lateral cross sections of the sub-medium regions 5a to 5d on the inner side and the sub-medium regions 6a to 6h on the outer side are located on each circumference of concentric circles having the center of the lateral cross section of the core region 2 as the common center according to the embodiment of the present invention and the first to fifth embodiment examples, the present invention is not limited to this scheme, but the centers of the lateral cross sections of the sub-medium regions 5a to 5d on the inner side and the sub-medium regions 6a to 6h on the outer side can be arranged on each circumference of different squares having the center of the lateral cross section of the core region 2 as the common center. The same goes for a case in which the number of sub-medium regions arranged in the cladding region is changed.

Furthermore, although the holes are formed in the cladding region by using a mechanical drill according to the embodiment and the first to the fifth embodiment examples of the present invention, the present invention is not limited to this scheme, but the holes can be formed by a silica tube by arranging the silica tube in the cladding region. By forming the holes by using the mechanical drill or the silica tube, and forming the sub-medium regions by filling a gaseous substance in the holes, the optical fiber 1 can be manufactured with ease and low cost, compared to a case in which a liquid or a solid substance is arranged in the cladding region.

Figure 10:
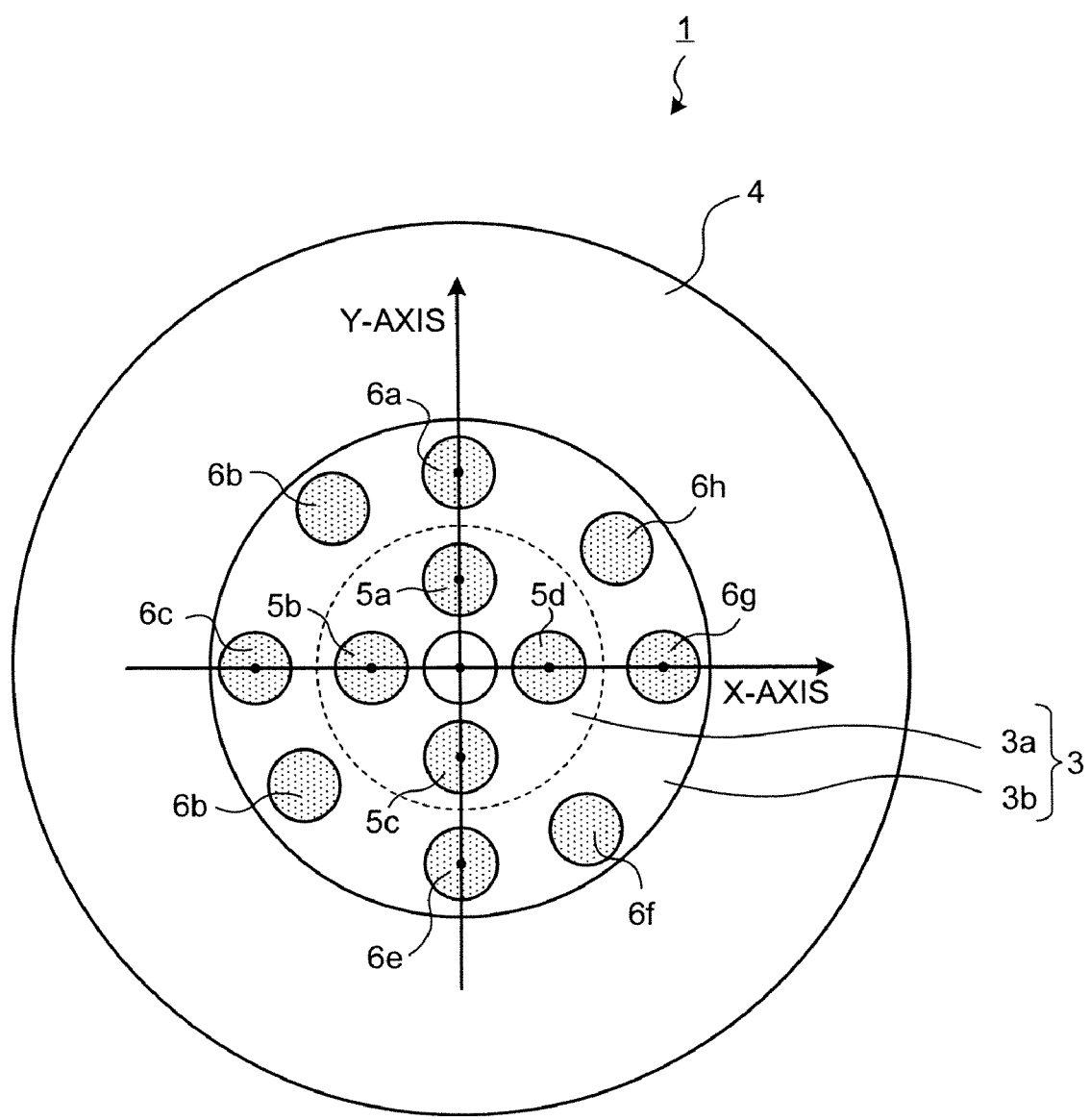
FIG. 10 is a lateral cross section of the optical fiber, illustrating another example of arranging the inner sub-medium region and the outer sub-medium region arranged in multilayer in the cladding region.

Although the centers of the lateral cross sections of the sub-medium regions on the outer side are located on lines (for example, the lines A1 and A2) that pass the centers of adjacent sub-medium regions from among the sub-medium regions on the inner side according to the embodiment of the present invention and the first to fifth embodiment examples, the present invention is not limited to this scheme, but the positional relation between the sub-medium regions on the inner side and the sub-medium regions on the outer side can be optional as long as the sub-medium regions are arranged at each position of the four folds rotational symmetry centering on the core region 2. In this case, for example as shown in FIG. 10, the centers of the lateral cross sections of the sub-medium regions 6a to 6h can be located on a line that passes the centers of the lateral cross sections of the sub-medium regions that are not adjacent to each other from among the sub-medium regions 5a to 5d on the inner side (i.e., the sub-medium regions 5a and 5c or the sub-medium regions 5b and 5d facing each other across the core region 2). The same goes for a case in which the number of sub-medium regions arranged in the cladding region is changed.

Moreover, although the two layers of the sub-medium regions are arranged in the cladding region according to the embodiment and the first to the fifth embodiment examples of the present invention, the present invention is not limited to this scheme, but more than two layers of the sub-medium regions can be arranged in the cladding region.

INDUSTRIAL APPLICABILITY

As described above, the optical fiber and the optical transmission medium according to the present invention are effective in a single mode optical transmission for transmitting a light in a single mode, and more particularly, are suitable for an optical fiber and an optical transmission medium that can lower the macro-bending loss against a small-diameter bending and reduce the PMD while realizing the single mode optical transmission.

The invention claimed is:

1. An optical fiber, comprising:
    a core region; and
    a cladding region, the cladding region including a first cladding region on outer circumference of the core region, the first cladding region including a main-medium region and a sub-medium region having a refractive index lower than a refractive index of the main-medium region,
    the sub-medium region includes
        inner sub-medium regions arranged at four folds rotationally symmetric centering on the core region,
        outer sub-medium regions arranged at four folds rotationally symmetric centering on the core region on outer side of the inner sub-medium regions, each of the four rotationally symmetric folds including a hole along a center axis of the core region, lateral cross sections of the inner sub-medium regions and lateral cross sections of the outer sub-medium regions are circular shaped having a substantially same diameter, the inner sub-medium regions and the outer sub-medium regions are formed with any one of a gaseous substance, a liquid, and a solid substance that fills inside of the hole, and
    wherein a mode field diameter at a wavelength of 1550 nanometers is equal to or larger than 6 micrometers and equal to or smaller than 11 micrometers. and a macro-bending loss with a curvature radius of 7.5 millimeters at the wavelength of 1550 nanometers is equal to or less than 0.1 dB/m.

2. The optical fiber according to claim 1, wherein the cladding region further includes a second cladding region that is homogeneous on outer circumference of the first cladding region, and a relative refractive index difference of the core region with respect to the second cladding region is equal to or larger than 0.3% and equal to or smaller than 0.4%.

3. The optical fiber according to claim 2, wherein a medium of the second cladding region is a pure silica glass.

4. The optical fiber according to claim 3, wherein a medium of the second cladding region is the same medium that forms the main-medium region of the first cladding region.

5. The optical fiber according to claim 2, wherein a medium of the second cladding region is a fluorine-doped silica glass.

6. The optical fiber according to claim 5, wherein a medium of the second cladding region is the same medium that forms the main-medium region of the first cladding region.

7. The optical fiber according to claim 1, wherein the core region is formed by a silica glass doped with at least one of germanium and phosphor.

8. The optical fiber according to claim 1, wherein a light in a wavelength band of equal to or longer than 1500 nanometers propagates through the optical fiber in a single mode.

9. The optical fiber according to claim 1, wherein a light in a wavelength band of equal to or longer than 1250 nanometers propagates through the optical fiber in a single mode.

10. The optical fiber according to claim 1, wherein a macro-bending loss with a curvature radius of 5.0 millimeters at a wavelength of 1550 nanometers is equal to or less than 0.1 dB/m.

11. An optical transmission medium including an optical fiber having a core region and a cladding region, the optical fiber being bent with a curvature radius of equal to or larger than 3 millimeters and equal to or smaller than 60 millimeters, wherein
    the cladding region includes a first cladding region on outer circumference of the core region, the first cladding region including a main-medium region and a sub-medium region having a refractive index lower than a refractive index of the main-medium region,
    the sub-medium region includes
        inner sub-medium regions arranged at four folds rotationally symmetric centering on the core region, and
        outer sub-medium regions arranged at four folds rotationally symmetric centering on the core region on outer side of the inner sub-medium regions, each of the four rotationally symmetric folds including a hole along a center axis of the core region, lateral cross sections of the inner sub-medium regions and lateral cross sections of the outer sub-medium regions are circular shaped having a substantially same diameter, the inner sub-medium regions and the outer sub-medium regions are formed with any one of a gaseous substance, a liquid, and a solid substance that fills inside of the hole, and
    wherein a mode field diameter at a wavelength of 1550 nanometers is equal to or larger than 6 micrometers and equal to or smaller than 11 micrometers, and a macro-bending loss with a curvature radius of 7.5 millimeters at the wavelength of 1550 nanometers is equal to or less than 0.1 dB/m.

12. The optical transmission medium according to claim 11, wherein the optical fiber is rolled in a coil with the curvature radius of equal to or larger than 3 millimeters and equal to or smaller than 60 millimeters.

13. The optical transmission medium according to claim 11, wherein the optical fiber is connected to another optical fiber in a condition in which an end of the sub-medium region formed in the cladding region along the center axis of the core region is sealed.

14. The optical transmission medium according to claim 13, wherein the end of the sub-medium region is sealed by filling a predetermined filling agent in the end of the sub-medium region.

15. The optical transmission medium according to claim 13, wherein the end of the sub-medium region is closed by collapsing the end of the sub-medium region.

* * * * *